May 25, 1965   R. A. G. WELSHER ETAL   3,185,509
CLAMPS

Filed July 23, 1962   2 Sheets-Sheet 1

United States Patent Office 3,185,509
Patented May 25, 1965

3,185,509
CLAMPS
Ronald Andrew George Welsher, Abingdon, Leslie William Carter, Harwell, and David James Salt, Wantage, England, assignors to United Kingdom Atomic Energy Authority, London, England
Filed July 23, 1962, Ser. No. 211,817
Claims priority, application Great Britain, Aug. 1, 1961, 27,963/61
3 Claims. (Cl. 287—54)

This invention relates to clamps and is particularly concerned with clamps for laboratory use, for example with chemical laboratory scaffolding.

According to the invention a clamp comprising a U-shaped body having means for gripping a member within the U is characterised in that the body is an extruded section and is formed with at least one rectangular channel, in its outer surface, of a width equal to the extruded length of the section whereof such sections may be interlocked together at right angles so as to join two members.

Also according to the invention the gripping means comprises a pin adapted to extend through axially aligned apertures in the respective limb of the U-shaped body and formed with a circumferential cam groove whereby a turn of the pin grips a member located between said limb.

Preferably the pin is provided with a flat leading in to said groove such that the pin may be inserted through the said limbs after the member is placed within the U-shaped body.

To enable the nature of the invention to be more readily understood, an embodiment of the invention will now be described by way of example with reference to the accompanying drawing. In the drawing FIG. 1 is an isometric view of a clamp body as extruded.

Figure 1:
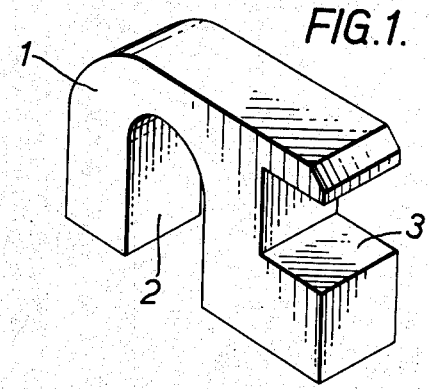
Figure 2:
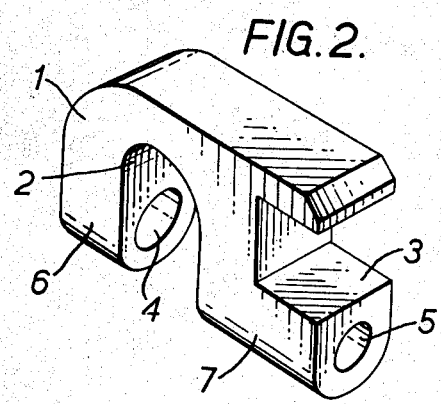
FIG. 2 is an isometric view of a clamp body ready for use.

Referring to the drawings, FIG. 1 shows a clamp body 1 as extruded in a high impact P.V.C. material. The body 1 is U-shaped and comprises two channels 2 and 3 extending in the direction of extrusion. Channel 2 is a U-shaped channel slightly larger than the member (usually a rod) which it is desired to clamp, and channel 3 is of rectangular cross-section having a channel width equal to the thickness or extruded length of the body 1. FIG. 2 illustrates the body 1 when drilled and shaped ready for use. Co-axial holes 4 and 5 are provided through limbs 6 and 7 of the body 1 to receive a stepped diameter clamping pin 8.

Figure 3:
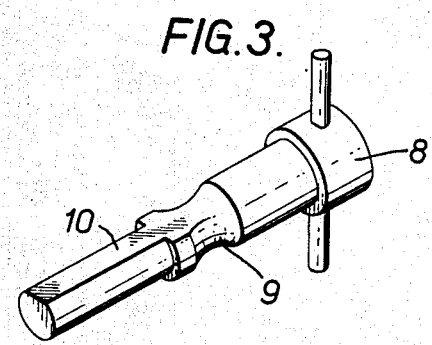
FIG. 3 is an isometric view of a clamping pin showing the cam groove and "lead in" surface.

Pin 8 is shown in FIG. 3 and is preferably made of an acid resisting material. The pin is rotatable in holes 4 and 5 and is provided with an eccentric circumferential cam groove 9 adapted to bear upon a rod held in the U-shaped channel 2. The cam groove 9 comprises an eccentric surface formed about the axis of pin 8 such that rotation of the pin clamps the rod in the channel 2. To enable the pin 8 to be inserted through holes 4 and 5 in the limbs 6 and 7 after insertion of a rod in channel 2, a segmental portion of the pin is removed to provide a flat "lead in" surface 10 extending from the small diameter end of the pin to the position of minimum radius on the surface of the cam groove.

Figure 4:
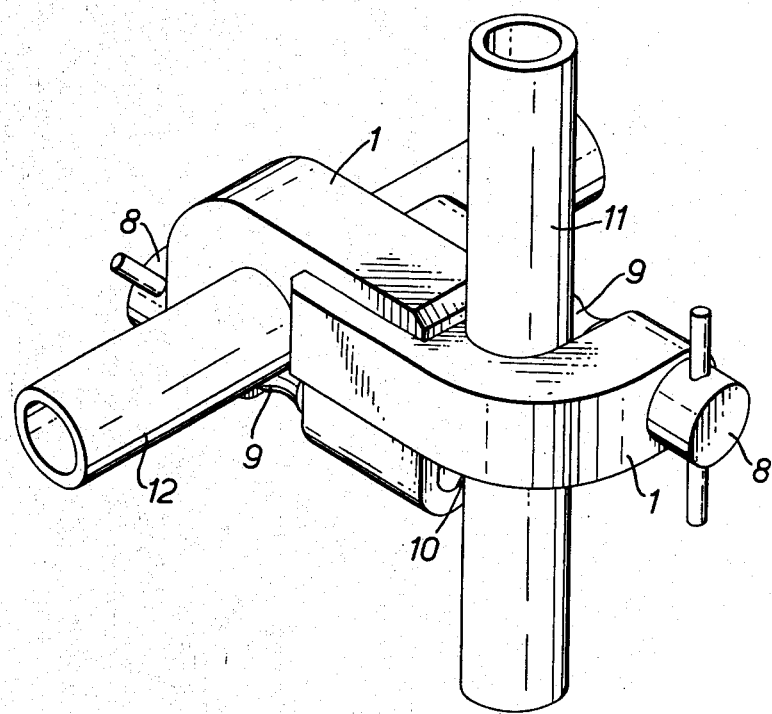
FIG. 4 is an isometric view of a clamp assembly.

When in use, as illustrated in FIG. 4, two clamp bodies 1 are joined together at 90° to each other by interlocking the channels 3 in each body. The rods 11 and 12 are placed in their respective body and pins 6 inserted in the co-axial holes 4 and 5 of each body with the flat surfaces 10 held adjacent to the rods during insertion. The pin 6 in each body is then rotated until the cam surface 9 on the pin bears upon the rod with sufficient pressure to clamp the rod to the body.

If desired the clamp sections may be joined together in a permanent manner by a suitable adhesive.

It will be appreciated that while the embodiment described relates to clamps which may be interlocked to form a clamping assembly for simple rods, a single clamp may be used in conjunction with various attachments. For example, a clamp body may be interlocked with a projection on base plate to provide a free standing support unit for laboratory equipment or with means for gripping beakers, flasks, etc.

We claim:

1. Clamp means for holding two rods at right angles, said clamp means comprising first and second clamp members, each clamp member comprising a block, said block having two side faces in substantially parallel alignment and at least one edge face perpendicular to said side faces extending around said block, means defining a U-channel extending transversely through the block perpendicular to said side faces thereof and defining a first opening in the edge face, means for gripping a rod within the U-channel, means defining a rectangular channel extending transversely through said block perpendicular to said side faces and defining a second opening in the edge face separate from said first opening, said rectangular channel being defined by a bottom wall and side walls perpendicular to said bottom wall, said bottom wall being spaced from said U-channel by a distance at least as great as the distance from said bottom wall to said second opening, and the spacing between the side walls being equal to the width of the bottom wall between the side faces of the block, whereby said first and second clamp members may be disposed with their respective side faces perpendicular by the intercoupling of respective rectangular channels, the block being of a sufficiently resilient material to allow a frictional interengaging of the two clamp members, thereby securing rods within the U-channels perpendicular one to the other.

2. A clamp according to claim 1 wherein said means for gripping a rod within said U-channel comprises pin means adapted to extend through axially aligned apertures extending from the opposing inside surfaces of said U-channel through the edge face of said block, said pin means being provided with a circumferential cam, the cam being adapted to be rotated to tightly engage a rod disposed within the U-channel.

3. A clamp according to claim 2 wherein said pin is further provided with a flat portion extending along the shank of said pin, whereby said pin may be inserted through the axially aligned apertures with a rod disposed within the U-channel.

References Cited by the Examiner
UNITED STATES PATENTS

| 1,578,634 | 3/26 | Borgmann. |
| 2,095,037 | 10/37 | Reintjes. |

FOREIGN PATENTS

| 1,081,563 | 6/54 | France. |
| 1,210,482 | 9/59 | France. |
| 587,028 | 4/47 | Great Britain. |

CARL W. TOMLIN, Primary Examiner.